(12) United States Patent
Tofflemire

(10) Patent No.: US 7,043,932 B2
(45) Date of Patent: May 16, 2006

(54) TEMPERATURE CONTROLLED AIR CARGO CONTAINER TRANSPORT DOLLY

(75) Inventor: David Tofflemire, Downey, CA (US)

(73) Assignee: Tofco Industrial, Inc., Downey, CA (US)

( * ) Notice: Subject to any disclaimer, the term of this patent is extended or adjusted under 35 U.S.C. 154(b) by 0 days.

(21) Appl. No.: 10/953,796

(22) Filed: Sep. 29, 2004

(65) Prior Publication Data

US 2006/0064993 A1   Mar. 30, 2006

(51) Int. Cl.
B60H 1/32   (2006.01)

(52) U.S. Cl. .......................................... 62/239; 62/236

(58) Field of Classification Search ................. 62/239, 62/323.3, 160, 159, 236, 243
See application file for complete search history.

(56) References Cited

U.S. PATENT DOCUMENTS

| | | | |
|---|---|---|---|
| 4,277,095 A * | 7/1981 | Barruw | 62/239 |
| 4,887,937 A * | 12/1989 | Thunnissen | 414/527 |
| 5,012,653 A * | 5/1991 | Ryde et al. | 62/323.3 |
| 5,054,295 A * | 10/1991 | Goulooze | 62/239 |
| 5,129,235 A | 7/1992 | Renken et al. | |
| 5,172,560 A * | 12/1992 | Jurewicz et al. | 62/160 |
| 5,249,429 A * | 10/1993 | Hanson | 62/236 |
| 5,319,941 A | 6/1994 | Schilling | |
| 5,323,622 A | 6/1994 | Weiner et al. | |
| 5,407,221 A * | 4/1995 | Haire et al. | 280/476.1 |
| 5,415,009 A | 5/1995 | Weiner et al. | |
| 5,830,057 A | 11/1998 | Hunt, Jr. | |
| 5,974,815 A | 11/1999 | Hwang et al. | |
| 6,014,866 A | 1/2000 | Durham | |
| 6,027,031 A | 2/2000 | Reason et al. | |
| 6,230,640 B1 | 5/2001 | Nordstrom et al. | |
| 6,256,905 B1 | 7/2001 | White | |
| 6,289,684 B1 | 9/2001 | Guidry, II et al. | |
| 6,446,452 B1 | 9/2002 | Durham | |
| 6,508,076 B1 | 1/2003 | Gast et al. | |
| 6,606,875 B1 | 8/2003 | Grand et al. | |
| 6,758,057 B1 | 7/2004 | Vince, II et al. | |
| 2003/0101742 A1 | 6/2003 | Norelius et al. | |
| 2004/0020236 A1 | 2/2004 | Vince, II et al. | |

* cited by examiner

Primary Examiner—Harry B. Tanner
(74) Attorney, Agent, or Firm—Stetina Brunda Garred & Brucker

(57) ABSTRACT

A temperature-controlled air cargo container transport dolly for use in transporting perishable cargo from an air cargo storage area to an aircraft. In a preferred embodiment, the air cargo container transport dolly comprises a conventional air cargo trailer having a housing structure mounted thereupon. The housing structure defines a cargo-holding interior within which perishable cargo, as stored within a conventional air cargo container, can be securely stored. To facilitate the ability to move such perishable cargo, rollers may be integrated into the flooring of the housing. A temperature control unit is further integrated within such housing to provide a temperature-controlled environment within the housing. The temperature-control unit will preferably be powered through a variety of means, whether from electricity from an external source, a battery, or by electric generator means, such as a diesel electric generator.

16 Claims, 4 Drawing Sheets

TEMPERATURE CONTROLLED AIR CARGO CONTAINER TRANSPORT DOLLY

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention is directed to temperature controlled air cargo container transport dollies for use in facilitating the storage and transport of perishable cargo from an airport cargo storage facility to an aircraft, as well as for enhancing the securing associated with such storage and transport practices.

The transport of perishable cargo by aircraft is well-known in the art. In this regard, such perishable cargo, which can encompass any type of product that must be maintained in a temperature-controlled environment, can only be efficiently and timely delivered by aircraft in many parts of the world. In fact, shipping via air is the only viable option of transporting many types of perishable goods. Exemplary of such type of goods include fresh produce, seafood, meat products, blood and a variety of other temperature-sensitive medications, such as vaccines and the like. Perishable cargo will also encompass many other types of products well-known to those skilled in the art.

While in some cases the duration that perishable cargo must go without being refrigerated (or heated) is of so short duration as to not affect the cargo, in many other instances perishable cargo will go for sufficient lengths of time from when delivered in a refrigerated condition at the airport to when the cargo is actually loaded on a plane. In this latter scenario, failure to continue providing adequate environmental control will cause the cargo to spoil or otherwise become unusable for its intended purpose. Such phenomena occurs very frequently with respect to food items and other heat sensitive materials such as blood and other biological products. The frequency that such damage occurs is also substantially high in areas having extremely hot climates as occurs in major cities in the states of Arizona, Nevada, New Mexico, and Texas during the summer months. Numerous other cities throughout the world likewise experience such extreme temperatures.

In practice, perishable cargo is typically containerized at refrigerated terminals and held in refrigeration until the same is transported to airlines, typically via refrigerated roller floor trucks, prior to flight time. As soon as such trucks are unloaded at the designated terminal at the airport, airline containers containing perishable cargo are first weighed and then placed into open container transport dollies for transport to the aircraft. At such point in the shipping process, however, the perishable cargo is no longer maintained in a temperature-controlled environment. As is well-known to those skilled in the art, such point in the transport of such cargo is referred to as a breaking in the "cool chain" where the perishable cargo is vulnerable to the temperatures of the external environment. During such time, the airline containers containing such perishable cargo will sit upon such open transport dollies, in some cases for up to four or more hours, and often times will be exposed to direct sunlight and extreme temperatures before ultimately being loaded into an aircraft for departure.

Such interval makes the perishable cargo especially vulnerable and it is during such time that substantial damage can occur by virtue of being exposed to a non-temperature controlled environment. In this regard, from the time that the temperature-controlled cargo is delivered to the airport and ultimately loaded on a plane, where the cargo is kept out of direct sunlight and at least protected to some extent by air conditioning, presents a significant risk that often times causes irreparable damage to the cargo resulting in substantial financial losses and property destruction.

These same issues also arise with respect to perishable air cargo being unloaded from aircraft. As discussed above, such interval from when the perishable cargo is unloaded from the aircraft to the time from when the same is ultimately stored in a temperature-controlled environment places such perishable cargo at substantial risk.

In addition to the foregoing problems associated with the potential spoilage of perishable air cargo resulting from a break in the "cool chain" is the additional vulnerability that such cargo can be tampered with, damaged, lost or even stolen. In this regard, many complications can and often do arise with respect to the transport of cargo to and from storage facilities to aircraft that, given the open nature by which perishable cargo is transported, present numerous opportunities where such unfortunate events can occur. Indeed, the risk for perishable cargo to become lost, damaged or stolen is exceptionally high at major airports that are very large and encounter heavy volumes of air traffic.

In fact, such vulnerability may even be deemed to pose a potential threat to safety and even national security. With respect to the former, it is well-known that the importation of numerous types of perishable cargo, and in particular agricultural products, can (or must) be inspected to insure that the same is not contaminated, whether by parasites, insects or any other type of contamination. In addition or, alternatively, the open nature by which air cargo is typically transported presents an opportunity that the same will go unchecked and thus exposes a vulnerability that the cargo can be detrimentally manipulated.

In order to provide at least some limited degree of protection, thermally insulated or refrigerated containers can and often are employed to facilitate the transport of perishable air cargo. While such containers and the like are known in the art, however, the same do not address the very specific need of being able to store and transport perishable cargo from an air cargo storage facility to the aircraft itself. Exemplary of such apparatus include those disclosed in Published U.S. patent application Ser. No. U.S. 2003/0101742 A1, published Jun. 5, 2003, for a modular air cargo container having a refrigerator unit and U.S. Pat. No. 6,289,684 B1, for a transportable, self-contained refrigerator system, each of which are operative to provide a temperature-controlled environment that are designed to be easily transported from one location to another. Such prior art devices, however, clearly lack any structure for use solely as a means for transporting perishable cargo for the very limited distance and duration from when perishable cargo is taken from an airport terminal to an aircraft, and no further. In this regard, the prior art is replete with containers that attempt to serve as storage containers that are transported with the perishable cargo to its final destination. Such temperature-controlled containers, however, are typically not operative to function as any type of dolly or trailer and are well-known in the art to be extremely difficult to track and retrieve. The latter aspect is especially difficult insofar as such transportable container mechanisms must be re-shipped to their original location or other specified destination. Because of the difficulties in the use of such container devices, the same are ill-suited to serve the very limited purpose of preserving the "cool chain" for the very limited distance and duration involving the time perishable cargo is delivered at the airport terminal to the time when the same is actually loaded on an aircraft.

In addition, such conventional containers typically do not provide any sort of means to keep the cargo in a sealed or locked condition while the same is being transported from cargo building to outbound aircraft, and vice versa. The failure of such conventional air cargo containers to provide means to secure such cargo also poses a risk that the cargo can be lost, stolen or misplaced, as well as presents an opportunity that contaminating agents, and in particular destructive insects known to infect many agricultural products imported into this country, can be released to cause further damage and contamination.

Therefore, there is a substantial need in the art for a mechanism, and in particular a temperature-controlled air cargo container transport dolly that enables perishable cargo to be quickly and easily transported from an airport storage terminal and onto an aircraft that preserves the "cool chain" to thus enable the perishable cargo to be maintained in a temperature-controlled environment during such interval. There is additionally a need in the art for such a container transport dolly that is reliable, may be fabricated from well-known and existing, commercially available products, is exceptionally easy to utilize by those skilled in the art, substantially eliminates the well-recognized difficulties associated with using temperature-controlled cargo containers, and can substantially minimize the damage to perishable cargo that could occur during such vulnerable period where perishable cargo is not maintained in a temperature-controlled environment prior to being loaded on an aircraft. There is yet further a need in the art for such a cargo container transport dolly that substantially reduces economic loss, is substantially cost-effective, and easy to implement utilizing conventional transportation practices.

BRIEF SUMMARY OF THE INVENTION

The present invention specifically addresses and alleviates the above-identified deficiencies in the art. In this regard, the present invention is directed to a temperature-controlled air cargo container transport dolly that is operative to facilitate the transport of perishable cargo from an airport terminal storage area to an aircraft where such perishable cargo is loaded. According to a preferred embodiment, the dolly comprises a conventional wheel-mounted air cargo trailer with a tow bar. Rigidly mounted upon the deck of the trailer is a housing defining an internal cargo storage area. Integrated within such housing is a temperature control unit that is operative to selectively control the temperature within the cargo storage area defined within the housing. Such temperature control unit will preferably comprise a conventional air conditioner and/or heater unit. Preferably, the air cargo container transport dolly will further include a power source, such as a battery and/or electric generator to thus provide power to the temperature control unit. In a preferred embodiment, the temperature control unit will be operative to be powered by either the self contained power source integrated within the dolly or an external AC power source.

The cargo storage area defined within the housing will preferably be sized and configured to receive and store a plurality of conventional air transport containers. To facilitate the handling of such multiple air cargo containers to be held within the housing, it is contemplated that rollers, conveyor belts or other similar types of mechanisms may be integrated within the flooring of such housing to thus expedite the ability of the air cargo to be stored within and removed from the housing. The housing will further be provided with access doors to thus enable the cargo holding area within the housing to be readily accessed for storage and removal of the air cargo, as well as to close off the cargo held within the housing to thus enable the temperature control unit to maintain the air cargo at a select temperature. Such access doors further provide means of securing the air cargo to thus substantially minimize, if not eliminate, the possibility that such goods can become lost, damaged or stolen. Moreover, such access doors provide means for isolating perishable cargo until such time as such cargo can be inspected, as frequently occurs with respect to the importation of certain agricultural products.

BRIEF DESCRIPTION OF THE DRAWINGS

These as well as other features of the present invention will become more apparent upon reference to the drawings.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
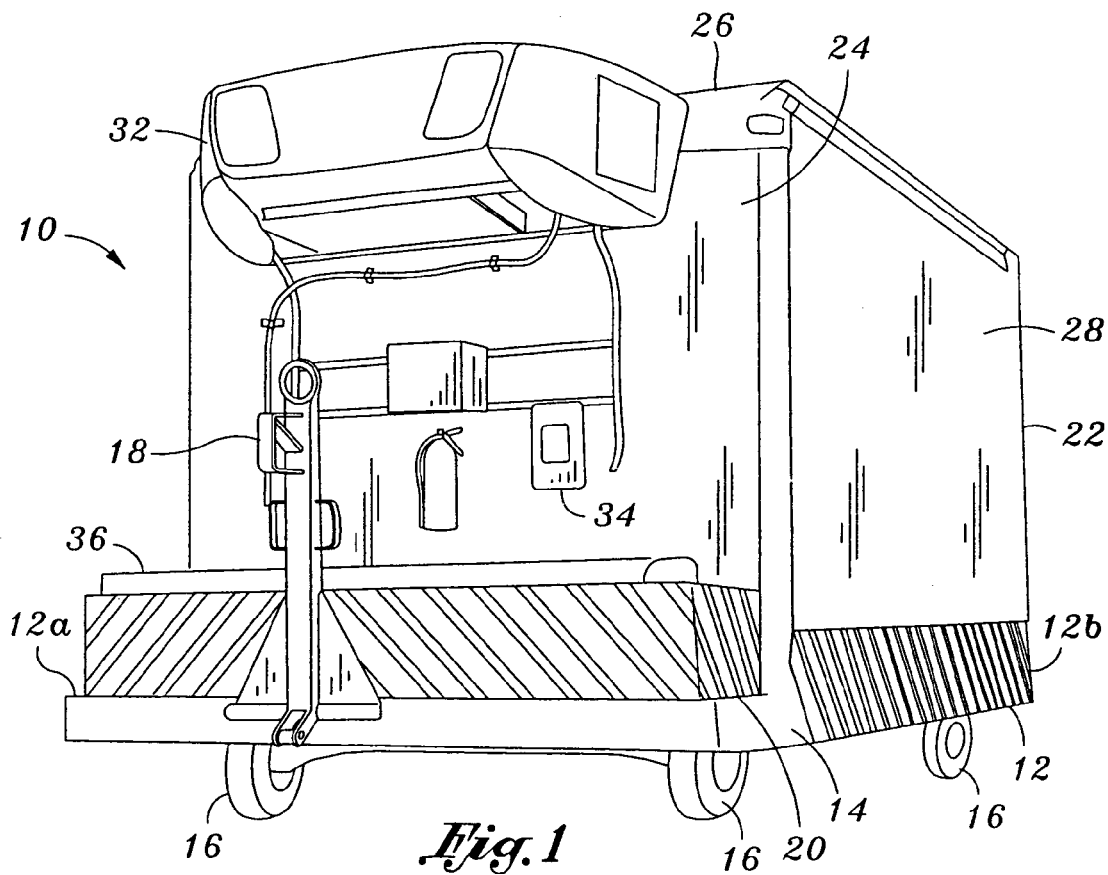
FIG. 1 is a front perspective view of a temperature-controlled air cargo container transport dolly constructed in accordance with a preferred embodiment of the present invention.

Referring now to the Figures, and initially to FIG. 1, there is perceptively illustrated a temperature controlled air cargo container transport dolly 10 constructed in accordance with a preferred embodiment of the present invention. As illustrated, the dolly 10 comprises a conventional trailer member 12 defined by a trailer chassis 14 resting upon a plurality of wheels 26. The trailer 12 defines front and rear ends 12a, 12b, opposed sides, and a top deck portion 20. Preferably, the front end 22a of the trailer is further provided with a conventional tow bar 18. Exemplary of such trailers ideally suited for use in the present invention include those trailers/container dollies produced by Wasp, Inc. of Glenwood, Minn. Likewise well-suited for use in the practice of the present invention include those container trailers produced by Clyde Machines, Inc. also of Glenwood, Minn. The trailer will further preferably be configured to have a front storage area for use in storing a power source discussed more fully below.

Figure 2:
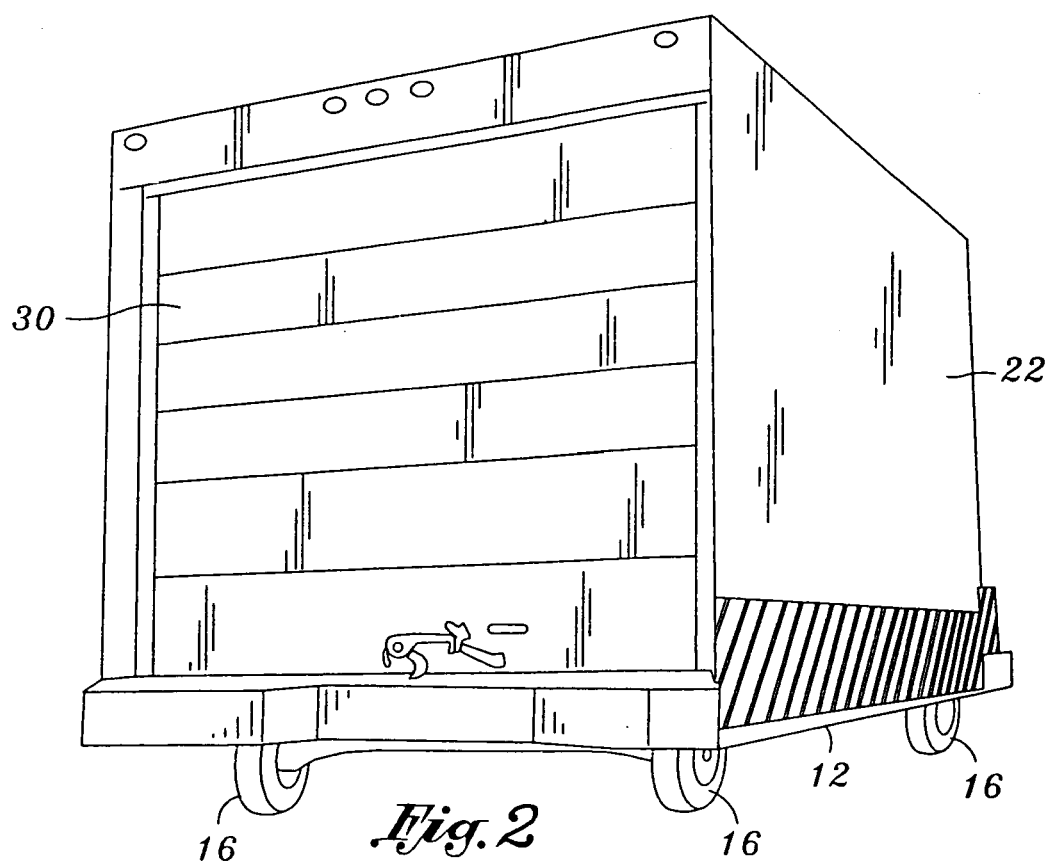
FIG. 2 is a rear perspective view of the air cargo container transport dolly of the present invention

Mounted upon the deck 20 of the trailer 12 is a housing member 22, the latter being operative to define a storage area therein, discussed more fully below. The housing 22 is defined by a front side wall 24, a ceiling 26, first and second side walls (28 being shown), and a floor, shown more clearly in FIGS. 3–6, and a rear side wall. With respect to the latter, the same will preferably comprise either a pair of hinged doors or a lockable roller-type overhead sectional door, shown as 30 in FIG. 2, to thus enable the housing 22 to be completely closed and selectively accessed, as desired. Advantageously, by providing means to secure the cargo within the dolly enables the same to remain protected, thus minimizing, if not eliminating, the possibility that such cargo can be tampered with, lost or stolen. Likewise, providing means for securing such storage enables the air cargo to be safely contained, as may be desired in certain applications where it is necessary to quarantine certain cargo for inspection. The housing may further preferably include one or more lights positioned thereabout to enhance the visibility of the dolly 10, and may further include safety markings painted or printed about its sides, as illustrated.

The housing 22 further has integrated therein a temperature control unit 32 shown in FIG. 1, which may take the form of an air conditioner/freezer/refrigeration unit and/or heater unit that preferably positioned to minimize interference with the space within the housing 22. Such temperature control units are well-known in the art and commercially available. Exemplary of such units include transport refrigeration container products produced by Carrier Corporation of Syracuse, N.Y. and include such products as Carrier Corporation's THINLINE, ELITELINE and STREAMLINE refrigeration units. A further exceptionally preferred transport refrigeration unit includes Carrier Corporation's SUPRA 550 model unit. In addition to, or in the alternative, the temperature control unit 32 may take the form of a heater to thus provide heat within the housing 22. Such heaters are likewise well-known in the art and commercially available.

Figure 1A:
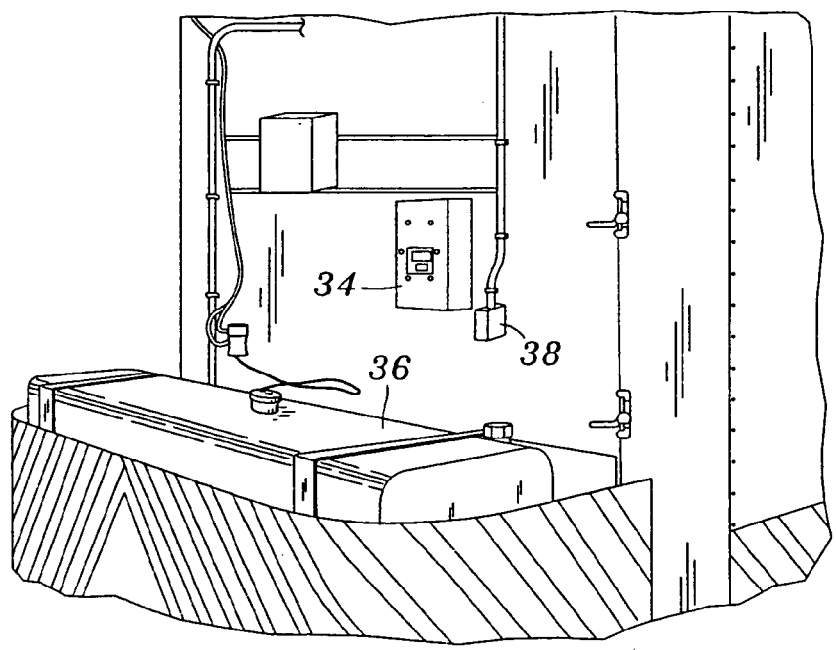
FIG. 1a is close-up frontal perspective photograph of the air cargo container transport dolly depicted in FIG. 1.

Referring now to FIGS. 1 and 1a, there is shown the control mechanism 34 by which the temperature control unit 32 may be selectively adjusted to provide a desired temperature within the housing 22. In this regard, the temperature control unit 32 will generate a refrigerated output via duct 32 shown in FIGS. 4 and 6 to the interior 40 of housing 22. Such control mechanisms are well-known in the art and integrated as part of the commercially-available products discussed above. In addition, it is expressly contemplated that in preferred embodiments of the present invention, the dolly 20 will have a power source 36 integrated therein, to thus provide a power source to the temperature control unit 32. Exemplary of such power sources include either batteries or electrical generators. With respect to the latter, any type of electricity generating generator may be utilized, and expressly includes either gasoline or diesel powered electrical generators. It is further contemplated that commercially-available generators used in connection with the aforementioned products produced by Carrier Corporation may also be utilized, including Carrier Corporation's undermount and clip-on generators. Preferably, such generators will be integrated within the frame of the trailer 12, and preferably at the front end 12a thereof to thus enable the power source to be closely connected to the temperature control unit 32.

As will be readily appreciated by those skilled in the art, by coupling a power source 36 with the temperature control unit 32, the dolly 20 can thus be placed in remote areas of an airfield with the temperature control unit 32 remaining operative to provide a select temperature to the interior of the housing 22, discussed more fully below. Such feature is considered exceptionally advantageous insofar as the prior art is completely lacking any type of dolly that can hold therein perishable cargo and maintain the same in a refrigerated state while the same awaits being loaded upon an aircraft. To provide greater flexibility, however, it is contemplated that the temperature control unit will preferably be operative to receive power from an external AC power source shown as 38 in FIG. 1a. In this regard, in those situations where it may not be feasible to run an electric generator or otherwise maintain a battery or other type of stand alone power means, utilizing an AC power source may be most advantageous.

Figure 3:
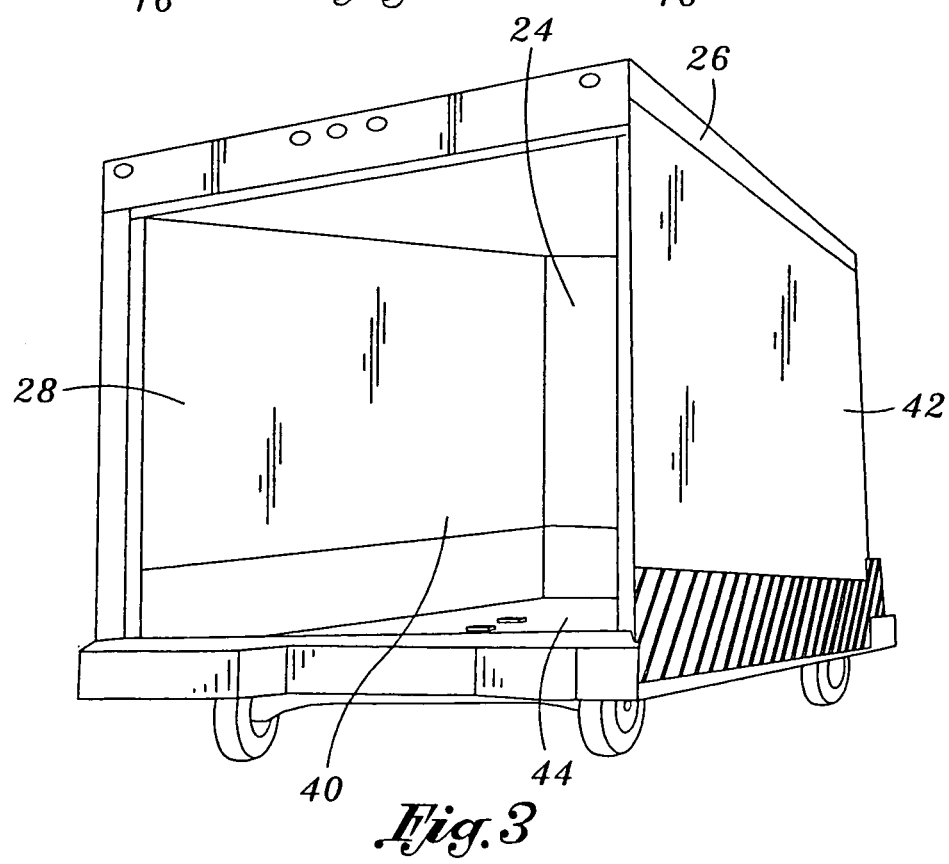
FIG. 3 is a rear perspective photograph of the interior of the container portion of the air cargo container transport dolly of the present invention.

Referring now to FIGS. 3–6, and initially to FIG. 3, there is shown the interior 40 defined by the housing 22. The interior 40 defines a cargo storage area within which perishable cargo can be stored, secured and isolated during the duration the same is transported from an air cargo terminal and onto the actual aircraft and vice versa. As discussed above, the cargo storage area is defined by first and second side walls 28, front wall 24 and ceiling 26 and flooring 44. As discussed above in relation to FIG. 2, it will be understood that the rear portion of the housing 22 will be defined by either doors or a roll-type sectional door to thus provide means to selectively access and secure the cargo within the interior of the housing, as well as create a closed environment within which the interior 40 of the housing 22 can be cooled and/or heated to a desired temperature. Preferably, the interior 40 of the housing 22 will be formed to have a width of 99", and length of 138" and a height of 74", although any of a variety of variations may be readily made by one skilled in the art.

In this regard, it is contemplated that the interior of the housing will be sufficiently large to store a maximum amount of perishable cargo while at the same time, in order to accommodate conventional cargo trailers as utilized in the preferred embodiments of the present invention, not overly large so as to strain the capacity of such cargo trailers. By way of example, the cargo storage area defined within the housing should be sized to accommodate multiple standardized air cargo containers such as United Airlines' LD3 containers, American Airlines' LD8 containers, Swiss Air cargo containers, KLM cargo containers, LD7 cargo pallets, and other standardized types of cargo holding devices well-known in the art, generally shown in phantom as 46 in FIGS. 4 and 6.

Figure 5:
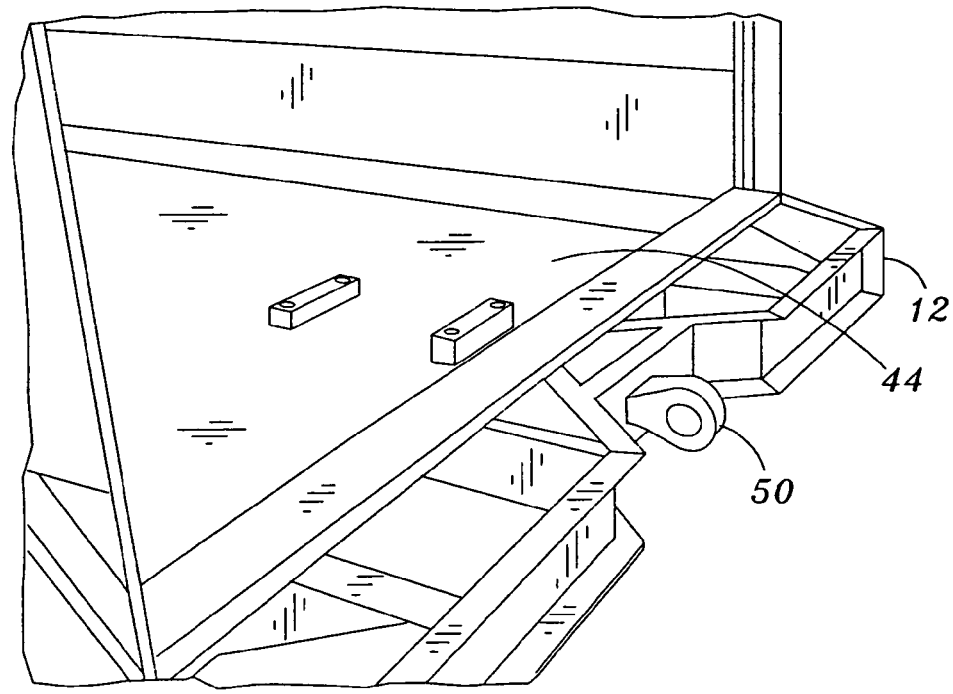
FIG. 5 is a photograph of the rear end of the trailer portion of the air cargo container transport dolly of the present invention.

In addition to accommodating such standardized containers, it is contemplated that the housing 22 formed upon the trailer 12 will be designed such that the same will not interfere with the functioning of the trailer so that it may be utilized as per conventional trailers. As shown in FIG. 5, it will be noted that the flooring 44 of the housing 22 will be such that the same can accommodate conventional trailer hitches 50 and the like that are pre-formed upon such trailers 12. In this respect, it is contemplated that the cargo dollies of the present invention may be readily integrated with existing airline cargo/dolly transport systems.

Figure 4:
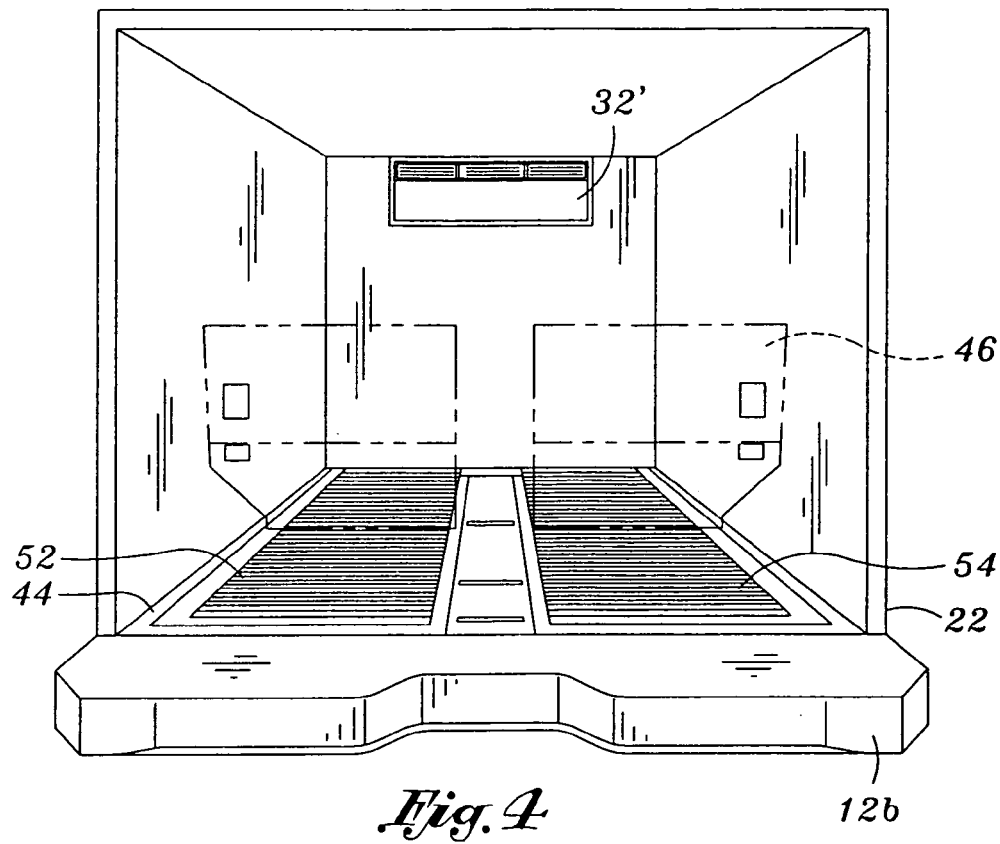
FIG. 4 is a an enlarged perspective view of the interior of the container portion depicted in FIG. 3 depicting a preferred embodiment whereby a plurality of rollers are integrated within such flooring.
Figure 6:
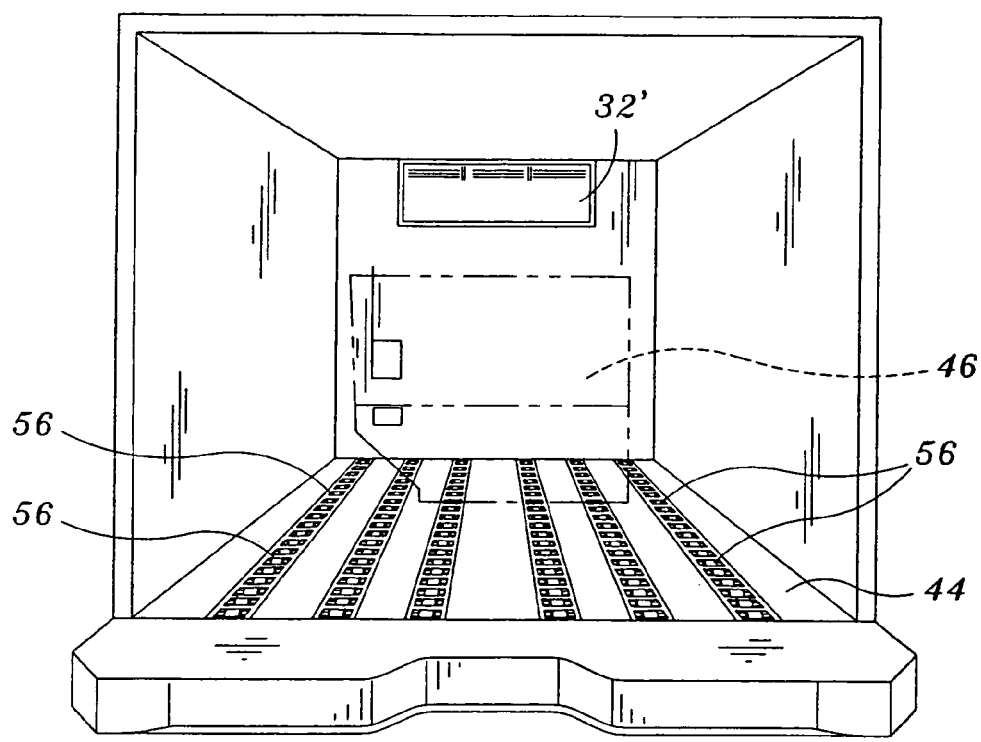
FIG. 6 is a perspective view of the floor of the container portion of the air cargo container transport dolly of the present invention depicting a second preferred embodiment integrating wheels into the flooring of the container portion.

Referring now to FIGS. 4 and 6, there are shown preferred types of flooring 44 as utilized within the housing 22 of the dolly 20 of the present invention. As illustrated in FIG. 4, the flooring 44 of the housing may be provided with a series of rollers or conveyor belts, and more specifically a plurality of rollers arranged in a series to thus enable cargo containers and the like to be readily rolled from the back to front of the housing, and vice versa. Preferably, two series of rollers 52, 54 as shown may be provide to thus enable multiple air cargo containers 46 to be readily stored within the housing in a space-efficient manner. The rollers 52, 54 further facilitate the ability to quickly load and unload such air cargo containers. In the alternative embodiment shown in FIG. 6, it is contemplated that a plurality of wheels may be integrated within the flooring that may further facilitate the ability to easily load and unload conventional air cargo containers 46.

Additional modifications and improvements of the present invention may also be apparent to those of ordinary skill in the art. In this regard, it is contemplated that the dolly may further be provided with a variety of conventional safety mechanisms to thus provide enhanced security and protection of the cargo stored therein. Along these lines, it is contemplated that the dolly may be provided with cargo tracking technology and other inventory control means to thus provide means for documenting the cargo being loaded and unloaded from the dolly. It is particularly contemplated that such dollies may be expressly deployed for use in the handling and transport of sensitive materials, such as combustible materials, radioactive materials, and the like, to thus maximize the security and protection associated with the transportation of such materials. Moreover, it is contemplated that the dolly will be particularly well suited to aid in the transport of materials that must necessarily be quarantined, such as hazardous materials or contaminated food products, until such time as such cargo can be inspected and/or further isolated. Thus, the particular combination of parts and steps described and illustrated herein is intended to represent only certain embodiments of the present invention, and is not intended to serve as limitations of alternative devices and methods within the spirit and scope of the invention.

What is claimed is:

1. A temperature controlled air cargo container transport dolly comprising:
   a) a wheel-mounted cargo trailer defining front and rear ends, said trailer defining a deck, said trailer further having a tow bar mounted at the front end thereof;
   b) a housing mounted upon said deck of said trailer, said housing defining a storage area adapted and configured to receive and store at least one standardized air cargo container; and
   c) a temperature control unit integrated within said housing and operative to selectively control the temperature within said storage area defined by said housing.

2. The temperature controlled air cargo container transport dolly of claim 1 wherein said dolly further includes a power source operative to provide power to said temperature control unit.

3. The temperature controlled air cargo container transport dolly of claim 2 wherein said power source is selected from the group consisting of an electric generator and a battery.

4. The temperature controlled air cargo container transport dolly of claim 3 wherein said generator comprises a diesel electric generator.

5. The temperature controlled air cargo container transport dolly of claim 1 wherein said temperature control device comprises a refrigeration unit.

6. The temperature controlled air cargo container transport dolly of claim 5 wherein said refrigeration unit is operative to be powered from an external AC power source.

7. The temperature controlled air cargo container transport dolly of claim 1 wherein said temperature control unit comprises a heater.

8. The temperature controlled air cargo container transport dolly of claim 7 wherein said heater is operative to be powered from an AC power source.

9. The temperature controlled air cargo container transport dolly of claim 1 wherein said internal storage area is defined by a floor, ceiling, front and rear walls, and opposed side walls.

10. The temperature controlled air cargo container transport dolly of claim 9 wherein said flooring has integrated therein a plurality of rollers to facilitate the loading and removal of air cargo container from within said housing.

11. The temperature controlled air cargo container transport dolly of claim 10 wherein said rollers comprise at least one row of elongate rollers being arranged in parallel relation to one another, said plurality of rollers being operative to roll said air cargo container thereacross.

12. The temperature controlled air cargo container transport dolly of claim 11 said flooring includes two sets of elongate rollers wherein each respective one of said set of rollers are arranged in generally parallel relation to one another.

13. The temperature controlled air cargo container transport dolly of claim 9 wherein said rear wall of said housing is defined by first and second door members that are cooperative to lockingly engage one another.

14. The temperature controlled air cargo container transport dolly of claim 9 wherein said rear wall of said housing is defined by a sectional roller door.

15. The temperature controlled air cargo container transport dolly of claim 14 wherein said rear wall comprises an overhead sectional door.

16. The temperature controlled air cargo container transport dolly of claim 1 wherein said standardized air cargo containers are selected from the group consisting of United Airlines' LD3 containers, American Airlines' LD8 containers, Swiss Air cargo containers, KLM cargo containers, and LD7 cargo pallets.

* * * * *